UNITED STATES PATENT OFFICE.

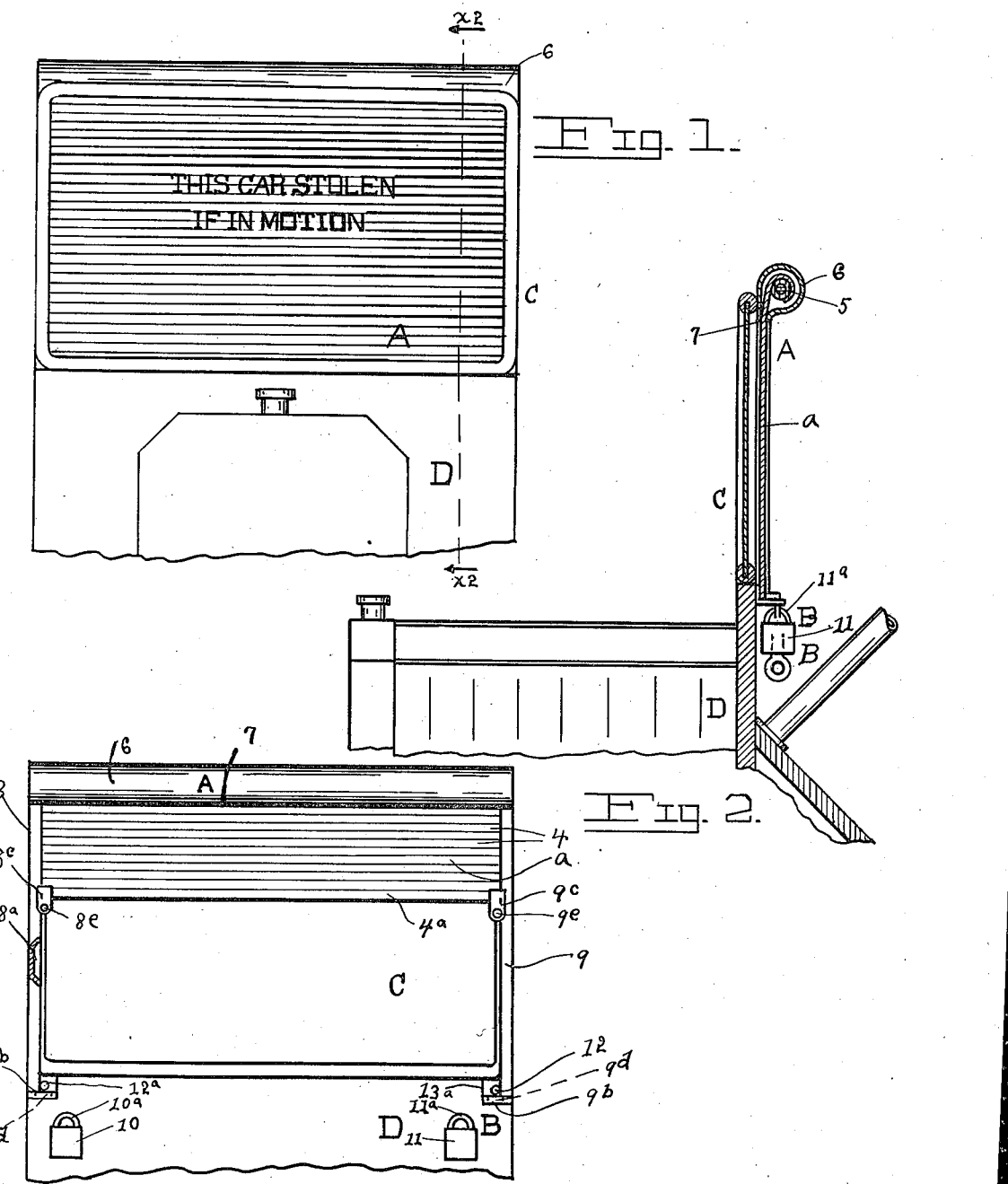

MARGARITA SCHUMACHER, OF LOS ANGELES, CALIFORNIA.

SAFETY MEANS FOR VEHICLES.

1,237,104.  Specification of Letters Patent.  Patented Aug. 14, 1917.

Application filed April 29, 1916.  Serial No. 94,450.

*To all whom it may concern:*

Be it known that I, MARGARITA SCHUMACHER, a citizen of the United States, residing at Los Angeles, in the county of Los Angeles and State of California, have invented new and useful Improvements in Safety Means for Vehicles, of which the following is a specification.

This invention relates to safety means for vehicles, and more particularly to safety means whereby the unauthorized driving of vehicles is prevented, and the invention has for its object to provide improved means of this general character which may be locked in position when a vehicle to which such means is applied is not in use by authorized persons.

In accordance with the invention, a curtain, blind or the like is mounted at the forward portion of the vehicle and in front of the driver's position, as for instance, on the wind shield of an automobile, and the same is so organized that it may readily be drawn into position to bar view of the roadway from the driver's seat, in which position it may be locked when it is desired to secure the vehicle against theft or use by persons not provided with the proper key or keys. Furthermore, such curtain may bear a legend, giving notice that the automobile or other vehicle to which the same is applied, is supposed by the authorized driver thereof to be at rest, thus attracting the attention of the public, generally, to the fact that a person tampering with the vehicle, or attempting to move the same or moving the same in spite of the drawn curtain, as by looking over or around the edge of the same, is not the proper owner of the vehicle and is, therefore, liable to arrest. Such curtain is conveniently mounted for removal or retraction from the position just mentioned, so that persons provided with a proper key may upon removal or retraction of the curtain see to properly drive the vehicle.

A further object of the invention is to provide safety means of the general character stated, which will be superior in point of relative simplicity and inexpensiveness of construction and organization, positiveness in operation, convenience in application and employment, neatness in appearance and unobstrusiveness of form and reliability, and which will be generally superior in efficiency and serviceability, and obviate the objections and disadvantages heretofore present in means of this general character.

With the above and other objects in view, the invention consists in the novel and useful provision, formation, construction, combination, association, method of application and relative arrangement of parts, members and features, all as hereinafter described, shown in the drawing, and finally pointed out in claims.

In the drawing:

Figure 1 is a fragmentary front view of an automobile equipped with safety means organized, constructed and applied in accordance with the invention and in position to prevent driving of the automobile;

Fig. 2 is a sectional view taken on the line $x^2$—$x^2$, Fig. 1, and looking in the direction of the appended arrows; and, Fig. 3 is an inside face view of a portion of the showing in the other figures, the safety means, however, being shown as only partly drawn.

Corresponding parts in all of the figures are designated by the same reference characters.

Referring with particularity to the drawing in the embodiment of the invention therein shown, the safety means is shown as comprising opaque means A and locking means B, the same being shown as applied to the wind shield C of an automobile D.

The opaque means A is shown as consisting of a preferably metallic curtain $a$, which may be built up of bars or strips 4 of suitable material which are joined together in any preferred manner to permit the rolling up of the curtain about a roller 5 which is preferably of the spring-actuated "Hartshorn" type and journaled in a suitable casing 6. The casing 6 is preferably cylindrical in form and is provided with a slot 7 to permit the extension and retraction of the curtain $a$, and is provided with a downwardly extending channel member 8 at one end of the slot 7, and a downwardly extending member 9 at the other end of the slot 7, such members 8 and 9 being preferably adjacent to the extreme ends of the cylindrical casing 6 and being of channel section, as shown at $8^a$, Fig. 3, the curtain $a$ at its side edges taking into such channel members 8 and 9 which act as guides therefor. The channel members 8 and 9 terminate in preferably horizontal projections 8ᵇ and 9ᵇ, respectively, such projections 8ᵇ and 9ᵇ being comprised within the locking means B. On the lowermost strip 4ᵃ of the curtain a, and at opposite ends of such strip, are secured hasps 8ᶜ and 9ᶜ, such hasps being also comprised within the locking means B.

The curtain a may have imprinted thereon "This car stolen if in motion" or words of like import, this legend giving notice that the car is being used by unauthorized persons, as the same will be displayed through the glass of the wind shield as illustrated in Fig. 1.

The locking means B is shown as comprising a plurality of padlocks 10 and 11, which may be of standard construction and provided with proper keys, the projections 8ᵇ and 9ᵇ, and the hasps 8ᶜ and 9ᶜ. When the curtain a is drawn down to its limit of travel, the hasps 8ᶜ and 9ᶜ pass through, respectively, apertures 8ᵈ and 9ᵈ provided in the projections 8ᵇ and 9ᵇ, respectively. The hasp 8ᶜ is provided with an aperture 8ᵉ and the hasp 9ᶜ is provided with an aperture 9ᵉ, and when the curtain is in locked position as shown in Fig. 3, the bow 10ᵃ of the padlock 10 is passed through the aperture 8ᵉ of the hasp 8ᶜ and the bow 11ᵃ of the padlock 11 is passed through the aperture 9ᵉ of the hasp 9ᶜ.

The opaque means A is shown as secured in position to the wind shield by means of screws or the like 12 passed through projecting ears 12ᵃ and 13ᵃ provided on the members 8 and 9, respectively, and at the side of such members lying next to the wind shield, as by passing the screws 12 through ears so arranged. The curtain a when drawn down and locked will prevent the removal of the device as the screw heads will be covered by the curtain.

The safety means is shown as applied on the inside face of a wind shield C of standard construction, this being the preferred position. However, the invention contemplates the application of the safety means in accordance with the requirements of any particular case, as it is not essential to the proper operation of the device to place the same behind a wind shield.

The method of use and advantages of the improved safety means will be readily understood from the foregoing description, taken in connection with the accompanying drawing and the following statement:

The spring roller 5, being adapted to wind the curtain about itself, will normally maintain the curtain so wound and permit vision through the wind shield or through the zone of the safety means. When it is desired to render the safety means effective, the curtain a is drawn downwardly against the tension of the spring comprised within the Hartshorn roller, until the hasps 8ᶜ and 9ᶜ project through the respective projections 8ᵇ and 9ᵇ, the padlocks being then applied to the hasps as by passing the bows of such padlocks, one through the aperture 8ᵉ in the hasp 8ᶜ and the other through the aperture 9ᵉ of the hasp 9ᶜ, and then locking such padlocks. After removal of the keys from the padlocks, if the automobile or other vehicle to which the safety means is applied or in which it is incorporated, is in motion or being unduly tampered with, the attention of the public generally will be attracted and explanation required as to why the curtain was not first rendered ineffective.

It is evident that persons provided with the proper keys may simply unlock the padlocks and remove them from the hasps, thus permitting the curtain to be re-wound about the roller 5 and out of the proper line of vision of the driver of the vehicle, a vehicle with its safety means so rendered ineffective, attracting no undue attention.

In the use of the invention it is in some cases desirable that the locking means be placed in a more conspicuous position than that illustrated in the drawing, as for instance, by reversing the safety means on the wind shield the roller is at the bottom, and the locking means will be at the top of the wind shield and tampering therewith will be more noticeable.

I do not wish to be understood as limiting myself to the specific disclosure herein, as many variations of and departures from such disclosure may be made without departing from the spirit of the invention and the terms of the following claims.

Having thus disclosed my invention, I claim and desire to secure by Letters Patent:

1. A vehicle provided with means for adjustably supporting a legend-bearing surface adapted to obscure the driver's vision and normally disposed so as to conceal such legend, and means for locking such surface positively in position to display such legend; such vehicle being provided with a forwardly facing transparent member behind which such means are disposed whereby such legend may be displayed through such transparent member.

2. A vehicle provided with a wind shield, a roller mounted adjacent the wind shield, a flexible member adapted to be wound upon the roller and bearing a legend or notice whereby such legend or notice may be concealed, and means for positively locking such member in extended position in proximity to the wind shield to display such legend or notice.

3. A vehicle provided with means for supporting anti-theft means; and anti-theft means adapted to be mounted in connection therewith; said anti-theft means comprising a member having a legend-bearing surface capable of being operatively positioned when such anti-theft means are mounted in connection with said supporting means so as to obscure the vehicle driver's vision and thus prevent driving of the vehicle; and means for positively locking such member with such legend-bearing surface so positioned.

In testimony whereof, I have signed my name to this specification in the presence of two subscribing witnesses.

MARGARITA SCHUMACHER.

Witnesses:
 ALFRED H. DAEHLER,
 EDWARD E. LEIGHTON.